Patented July 10, 1934

1,966,406

UNITED STATES PATENT OFFICE 1,966,406

EUHEDRAL CORUNDUM CRYSTAL

Earl Leeson Hauman, St. Catharines, Ontario, Canada, assignor to The Exolon Company, Blasdell, N. Y., a corporation of Massachusetts No Drawing. Application October 8, 1928, Serial No. 311,262. Renewed December 5, 1933

13 Claims. (Cl. 75—22.5)

My present invention provides for the commercial production of alpha corundum either in separate or separable euhedral form of high crystal development or in dispersion in a glassy matrix.

The materials produced are of high abrasive or refractory values and the processes involved simple and definite so as to be capable of commercial working.

It has I believe been impossible to produce "alpha" corundum crystals of euhedral type or at least to do so commercially or if such were produced they were only rarely incidentally included in other products, as for example mixed in mullite. In fact, I would point out that it is the degenerative tendency toward mullite, in an aluminous melt containing considerable silica, which is in process of solidification, that has made it so difficult to obtain a preponderance of corundum in the solid mass.

In making ordinary corundum products it has heretofore been customary to hold down or eliminate the silica as low as possible to try to prevent as far as possible the development of mullite. Ordinarily, such products carry impurities such as metallic oxides and while crystalline do not show anything of euhedral type.

My invention contemplates a process by which I can produce corundum of high purity in a matrix, rich in silica and to the practical exclusion of mullite. By this process I can produce corundum crystals of alpha type and of euhedral form and can develop these to extended crystal growth. In fact, my process can be so worked as to give at one side a euhedral crystal dispersion in a glassy matrix well adapted for refractory purposes, and special abrasive uses, or on the other side extended and accumulated growths of such crystals separable from the matrix material and of high abrasive and refractory values.

As illustrative of the principles involved I will describe the practice of my invention in two characteristic cases of product each novel in itself but resultant from the underlying principles involved in my invention.

I may explain at the outset that I find that the use of a minimum of silica in the melt is not, as in the production of ordinary corundum, a prime determining factor. Under ordinary conditions too high silica in the melt promotes mullite formation which is detrimental to the structure. Under my invention this does not hold true. In fact, I find for my purposes that the presence of a considerable amount of silica (say up to 25%) does no harm and is favorable to certain desiderata, notably that of crystal development and accretion.

In the practice of my invention I proceed as follows: A mixture of raw materials is prepared consisting of aluminous ore such as Bauxite or diaspore, silica sand, and an addition agent such as magnesia so proportioned as to give the following ration of important ingredients:

$Al_2O_3$ ---- 70
$SiO_2$ ---- 25
$MgO$ ---- 5

This mixture may be fused in an electric furnace of the steel shell arc type commonly used in the artificial abrasive industry. The ratio of power input to application of the mix is observed closely as means of governing the temperature of the melt. Thus, under any given rate of power input, a fast feed produces a relatively cool melt, whereas a retarded feed tends to produce a relatively hot bath. I have discovered that the temperature of the melt as the time of withdrawal of the power, determines the size and distribution of the corundum crystals. The cool melt produces small crystals uniformly spread through the matrix whereas the hot melt gives rise to the development of large crystals, in pocket formation in the mass.

After the shell has been charged to its capacity and the fusion is completed the electrodes are withdrawn and the cooling process allowed to proceed normally.

I have found that the addition of magnesia to the melt might be lowered with similar results in a furnace of small dimensions. For instance 2½% MgO in a mass of 1000 pounds is sufficient, whereas a melt approaching 8000 pounds needs 5% MgO for similar results, as to crystallization of the corundum.

The use of magnesia in relatively small amounts, as a component of the melt in which alumina and silica exist, roughly, 3 to 1, is to provide a balancing or reactive influence against those factors governing the rate of cooling existing in the process of solidifying a melt in the electric furnace. With magnesia present in small amount, say 5%, the temperature of formation of mullite falls off sharply, thereby increasing or extending the time for corundum crystal growth and at the same time decreasing the later period of time for mullite development. During this later reactive period wherein attack on the corundum crystal by the liquid normally occurs, the advantage of mass or size of the corundum crystal is effective in retarding this destructive action. The steel shell, water cooled furnace is particularly adapted for the practice of my process because the cooling characteristics of the shell can be balanced by magnesia to the practical exclusion of mullite growth in the melt previously described. Such melt may be adjusted to present a molecular ratio of alumina to silica slightly in excess of 3 to 2, but in the practice of the invention it has been found necessary in attaining consistent results to vary this ratio within small limits depending upon quantity of melt being handled.

While I prefer magnesia as my addition agent because of its apparent superior efficiency other agents of flux like character such as lime may be used.

The difference in structure mentioned above as resulting from the cool or hot melts allows a choice of two products. The structure characterized by small, uniformly distributed crystals in the matrix is taken in this form as a product. On the other hand, the mass bearing segregations of large corundum crystals is broken down and subjected to electrostatic separation for accumulation of the corundum product. Although proportions may vary largely according to the particular characteristics wanted in the ultimate product the following analyses are typical of the products obtained by my method:—

|                    | A   | B    | C  |
|--------------------|-----|------|----|
| Glassy matrix      | 25  | 26.5 | 28 |
| Euhedral corundum  | 75  | 68.5 | 62 |
| Mullite            | 00  | 5    | 10 |
|                    | 100 | 100  | 100|

Any of the foregoing products may be obtained from the same mix by varying the furnace size, or assuming that they are all to be fused in the same furnace, the several products could be obtained by varying either the alumina-silica ratio or the percentage of magnesia addition.

As a matter of fact the mullite might be present in even greater amount, say up to 15%, than the amount indicated in Table C and still give a product which is commercially useful. Similarly the ratio of glassy matrix to alpha corundum might be varied beyond the limits given in the foregoing tables. I have obtained commercially useful products in which the corundum limits were between 60% and 75% and the glassy matrix between 20% and 30%, the only requirement being that there shall be enough glassy matrix to promote the free growth of the corundum crystals to the substantial exclusion of the mullite, meaning thereby that the later period of mullite formation shall be either so shortened that the mullite will be present in relatively inconsiderable quantity, or entirely eliminated. Experience would indicate that anything under 20% of glassy matrix is an insufficient amount of glassy matrix to permit the free growth of the corundum crystal and I therefore set 20% as my lower limit for the glassy matrix.

As to the preponderance of corundum over mullite this depends upon the particular use to which the final product is to be put and in any event means a product in which the corundum crystals constitute more than half of the mass of corundum crystals, mullite and glassy matrix. Cross reference is made to my companion applications, Serial Numbers 599,599 and 593,600, both filed March 17. 1932.

What I therefore claim and desire to secure by Letters Patent is:

1. The process which consists in fusing a mixture of alumina and silica and magnesia in such proportions as to yield on solidfication a preponderance of alpha corundum of euhedral crystalline characteristics in a glassy matrix, the proportions being approximately three parts alumina to one part silica with magnesia addition approximately 5% of the batch.

2. The process which consists in fusing a mixture of alumina and silica and magnesia in such proportions as to yield on solidification a preponderance of alpha corundum of euhedral crystalline characteristics in a glassy matrix with mullite in negligible amount, the proportions being approximately three parts alumina to one part silica with magnesia addition approximately 5% of the batch.

3. The process which consists in fusing a mixture of alumina and silica in the presence of an oxide of the group composed of calcium oxide and magnesium oxide and in such proportions as to yield on solidification a preponderance of alpha corundum of euhedral crystalline characteristics in a glassy matrix, the proportions being approximately three parts alumina to one part silica with alkaline earth oxide addition approximately 5% of the batch.

4. The furnace process in which alpha corundum crystals of euhedral type are produced, which consists in fusing a mixture of approximately 3 parts alumina to one part silica with accompanying reagent of approximately 5% of the batch of an oxide of the group composed of calcium oxide and magnesium oxide, in which said reagent is employed to counter balance the cooling characteristics of the furnace thereby extending the period of corundum crystal growth and shortening or eliminating the later period of mullite development.

5. The furnace method of promoting free crystallization of alpha corundum in a glassy matrix, which consists in fusing an alumina silica mixture which should give mullite and corundum with the mullite in preponderance with a balancing agent of an oxide of the group composed of calcium oxide and magnesium oxide in sufficient quantity to extend the period of corundum crystallization during cooling of the melt and to shorten or eliminate the later period of mullite development whereby to produce a preponderance of alpha corundum of euhedral characteristic with a considerably lesser amount of mullite in the glassy matrix.

6. The furnace method of promoting free crystallization of alpha corundum in a glassy matrix, which consists in fusing an alumina silica mixture which should give mullite and corundum with the mullite in preponderance with from approximately 2½% to 5% of a balancing agent of an oxide of the group composed of calcium oxide and magnesium oxide to extend the period of corundum crystallization during cooling of the melt and to shorten or eliminate the later period of mullite development whereby to produce a preponderance of alpha corundum of euhedral characteristic with a considerably lesser amount of mullite in the glassy matrix.

7. The furnace method of promoting free crystallization of alpha corundum in a glassy matrix, which consists in fusing an alumina silica mixture which should give mullite and corundum with the mullite in preponderance with magnesia in sufficient quantity to extend the period of corundum crystallization during cooling of the melt and to shorten or eliminate the later period of mullite development whereby to produce a preponderance of alpha corundum of euhedral characteristic with a considerably lesser amount of mullite in the glassy matrix.

8. The furnace method of promoting free crystallization of alpha corundum in a glassy matrix, which consists in fusing an alumina silica mixture which should give mullite and corundum with the mullite in preponderance with from approximately 2½% to 5% of magnesia to extend the period of corundum crystallization during cooling of the melt and to shorten or eliminate the later period of mullite development whereby to produce a preponderance of alpha corundum of euhedral characteristic with a considerably lesser amount of mullite in the glassy matrix.

9. Alpha corundum crystals of euhedral characteristic derived from a furnace melt of alumina and silica which should give mullite and corundum with a preponderance of mullite but which melt when altered by the addition of a balancing agent of an oxide of the group composed of calcium oxide and magnesium oxide in sufficient quantity yields on solidification a glassy matrix in sufficient amount to counterbalance the cooling characteristic of the furnace and to provide for the free growth of the corundum crystals in the matrix by extending the period of corundum growth and shortening or eliminating the later period of mullite development, said corundum crystals being characterized by high purity of composition, platy form, and freely developed structure, and by being present in the glassy matrix in predominating amount in respect to the mullite.

10. As a new composition of matter, a fusion product resulting from the fusion and cooling of an alumina silica mix which should give mullite in preponderance to corundum but which when modified by the addition of from 2½% to 5% of an oxide of the group composed of calcium oxide and magnesium oxide to counterbalance the cooling characteristic of the furnace and thereby extend the period of corundum crystal growth and shorten or eliminate the later period of mullite development, forms a mass consisting of a glassy matrix containing alpha corundum crystals of relatively large freely developed type, the alpha corundum crystals constituting a preponderance of the mass, and the glassy matrix being present in sufficient amount to have caused the free growth of the corundum crystals with little or no mullite formation.

11. As a new composition of matter, a mass consisting of a glassy matrix containing alpha corundum crystals of relatively large freely developed type, the alpha corundum crystals constituting a preponderance of the mass, and the glassy matrix being present in sufficient amount to have caused the free growth of the corundum crystals and containing a small amount of an oxide of the group composed of calcium oxide and magnesium oxide.

12. As a new composition of matter resulting from the fusion and cooling of a mix of alumina and silica which should give mullite in preponderance to corundum, but which when modified by the addition of a small amount of an oxide of the group composed of calcium oxide and magnesium oxide forms a mass consisting of a glassy matrix containing alpha corundum crystals of relatively large freely developed type, the alpha corundum crystals constituting a preponderance of the mass, and the glassy matrix being present in sufficient amount to have caused the free growth of the corundum crystals with little or no mullite formation.

13. A composition of matter as claimed in claim 12 wherein the oxide is a magnesium oxide.

EARL LEESON HAUMAN.